(12) United States Patent
Cheng et al.

(10) Patent No.: US 11,991,651 B2
(45) Date of Patent: May 21, 2024

(54) FLOATING SMTC FOR SSB-BASED RRM IN ASYNCHRONOUS NETWORKS

(71) Applicant: QUALCOMM Incorporated, San Diego, CA (US)

(72) Inventors: Peng Cheng, Beijing (CN); Huichun Liu, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 17/286,750

(22) PCT Filed: Oct. 19, 2019

(86) PCT No.: PCT/CN2019/112062
§ 371 (c)(1),
(2) Date: Apr. 19, 2021

(87) PCT Pub. No.: WO2020/083120
PCT Pub. Date: Apr. 30, 2020

(65) Prior Publication Data
US 2021/0385765 A1 Dec. 9, 2021

(30) Foreign Application Priority Data

Oct. 22, 2018 (WO) ................ PCT/CN2018/111192

(51) Int. Cl.
*H04W 56/00* (2009.01)
*H04W 24/08* (2009.01)
(52) U.S. Cl.
CPC ......... *H04W 56/001* (2013.01); *H04W 24/08* (2013.01)

(58) Field of Classification Search
None
See application file for complete search history.

(56) References Cited

U.S. PATENT DOCUMENTS

2018/0262313 A1 9/2018 Nam et al.
2018/0279145 A1 9/2018 Jung et al.
(Continued)

FOREIGN PATENT DOCUMENTS

| CN | 107295640 A | 10/2017 | |
|---|---|---|---|
| WO | WO-2016119219 A1 * | 8/2016 | ............ H04W 72/00 |
| WO | 2018172996 A1 | 9/2018 | |

OTHER PUBLICATIONS

"3rd Generation Partnership Project; Technical Specification Group Radio Access Network; NR; Requirements for support of radio resource management (Release 15)", 3GPP TS 38.133, V15.3.0, Sep. 30, 2018 (Sep. 30, 2018), 135 Pages, Sections 6.1.2.2, 9.1.2.

(Continued)

*Primary Examiner* — Saumit Shah
(74) *Attorney, Agent, or Firm* — Patterson & Sheridan LLP

(57) ABSTRACT

Certain aspects of the present disclosure provide techniques for a floating synchronization signal block measurement timing configuration (SMTC) for SSB-based radio resource management (RRM) in asynchronous networks, such as new radio (NR). A base station (BS) determines a floating SMTC for measurement of a target cell and provides the floating SMTC to at least one user equipment (UE) in the serving cell, wherein the target cell and the serving cell are asynchronous. The BS determines a measurement gap that covers the floating SMTC. The UE monitors in the measurement gap for a SSB transmission of the target cell based on the floating SMTC.

24 Claims, 13 Drawing Sheets

(56) References Cited

U.S. PATENT DOCUMENTS

| | | | | |
|---|---|---|---|---|
| 2019/0306734 | A1* | 10/2019 | Huang | H04W 24/08 |
| 2019/0350023 | A1* | 11/2019 | Novlan | H04L 5/16 |
| 2020/0358547 | A1* | 11/2020 | Liu | H04W 48/16 |
| 2021/0014777 | A1* | 1/2021 | You | H04W 40/24 |
| 2021/0185553 | A1* | 6/2021 | Shi | H04L 5/0098 |
| 2021/0227479 | A1* | 7/2021 | Harada | H04W 56/0035 |
| 2022/0046442 | A1* | 2/2022 | Li | H04W 36/0094 |

OTHER PUBLICATIONS

International Search Report and Written Opinion—PCT/CN2018/111192—ISA/EPO—dated Jul. 5, 2019.

International Search Report and Written Opinion—PCT/CN2019/112062—ISA/EPO—dated Jan. 16, 2020.

Qualcomm Incorporated: "Initial Access and Mobility Procedures for NR Unlicensed", 3GPP TGS RAN WG1 Meeting #94bis, R1-1811253, Oct. 12, 2018, pp. 1-13.

ERICSSON: "Further Considerations on Measurement Gaps for NR", 3GPP TSG-RAN WG4 Meeting #NR-AH-03, R4-1709316, Measurement_Gap_Discussion, 3GPP, Mobile Competence Centre, 650, Route Des Lucioles, F-06921 Sophia-Antipolis Cedex, France, vol. RAN WG4, No. Nagoya, Japan, Sep. 18, 2017-Sep. 21, 2017, Sep. 17, 2017, XP051344457, 5 Pages, URL:http://www.3gpp.org/ftp/Meetings_3GPP_SYNC/RAN4/Docs/.

LG Electronics: "Discussion on Measurement Gap Configuration in Multiple Frequency Layers for NR", 3GPP TSG-RAN WG4 Meeting #84bis, R4-1710614, Discussion on Measurement Gap Configuration in Multiple Frequency Layers for NR, 3GPP, Mobile Competence Centre, 650, Route Des Lucioles, F-06921 Sophia-Antipolis Cedex, France, vol. RAN WG4, No. Dubrovnik , Croatia, Oct. 9, 2017-Oct. 13, 2017, Oct. 8, 2017, XP051345430, 3 Pages, URL:http://www.3gpp.org/ftp/Meetings_3GPP_SYNC/RAN4/Docs/.

SAMSUNG: "Remaining Issue on RMSI CORESET Configuration", 3GPP TSG RAN WG1 Meeting #93, R1-1807734, 3GPP, Mobile Competence Centre, 650, Route Des Lucioles, F-06921 Sophia-Antipolis Cedex, France, vol. RAN WG1, No. Busan, Korea, May 21, 2018-May 25, 2018, May 24, 2018, XP051463357, 7 Pages, URL:http://www.3gpp.org/ftp/tsg%5Fran/WG1%5FRL1/TSGR1%5F93/Docs.

Supplementary European Search Report—19877347.5—Search Authority—MUNICH—dated Aug. 1, 2022.

\* cited by examiner

FLOATING SMTC FOR SSB-BASED RRM IN ASYNCHRONOUS NETWORKS

CROSS REFERENCE TO RELATED APPLICATIONS

This application is a national stage application under 35 U.S.C. 371 of PCT/CN2019/112062, filed Oct. 19, 2019, which claims priority to International Patent Cooperation Treaty Application No. PCT/CN2018/111192, filed Oct. 22, 2018, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for a floating synchronization signal block measurement timing configuration (SMTC) for SSB-based radio resource management (RRM) measurements in asynchronous networks, such as new radio (NR).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS) of a serving cell. The method generally includes determining a floating synchronization signal block measurement timing configuration (SMTC) for measurement of a target cell, wherein the serving cell and the target cell are asynchronous, and providing the floating SMTC to at least one user equipment (UE) in the serving cell. The method generally includes determining a measurement gap that covers the floating SMTC.

Certain aspects provide a method for wireless communication by a UE. The method generally includes receiving, from a serving cell, a floating SMTC for measurement of a target cell, wherein the serving cell and the target cell are asynchronous. The method generally includes determining a measurement gap that covers the floating SMTC and monitoring in the determined measurement gap for a SSB transmission of the target cell based on the floating SMTC.

Certain aspects provide an apparatus for wireless communication in a serving cell. The apparatus generally includes means for determining a floating SMTC for measurement of a target cell, wherein the serving cell and the target cell are asynchronous, and means for providing the floating SMTC to at least one UE in the serving cell. The apparatus generally includes means for determining a measurement gap that covers the floating SMTC.

Certain aspects provide an apparatus for wireless communication. The apparatus generally includes means for receiving, from a serving cell, a floating SMTC for measurement of a target cell, wherein the serving cell and the target cell are asynchronous. The apparatus generally includes means for determining a measurement gap that covers the floating SMTC and means for monitoring in the determined measurement gap for a SSB transmission of the target cell based on the floating SMTC.

Certain aspects provide an apparatus for wireless communication in a serving cell. The apparatus generally includes at least one processor coupled with a memory and configured to determine a floating SMTC for measurement of a target cell, wherein the serving cell and the target cell are asynchronous, and to provide the floating SMTC to at least one UE in the serving cell. The at least one processor is configured to determine a measurement gap that covers the floating SMTC.

Certain aspects provide an apparatus for wireless communication. The apparatus generally includes at least one processor coupled with a memory and configured to receive, from a serving cell, a floating SMTC for measurement of a target cell, wherein the serving cell and the target cell are asynchronous. The at least one processor is configured to determine a measurement gap that covers the floating SMTC and monitor in the determined measurement gap for a SSB transmission of the target cell based on the floating SMTC.

Certain aspects provide a computer readable medium having computer executable code stored thereon for wireless communication in a serving cell. The computer executable code generally includes code for determining a floating SMTC for measurement of a target cell, wherein the serving cell and the target cell are asynchronous, and code for providing the floating SMTC to at least one UE in the serving cell. The computer executable code generally includes code for determining a measurement gap that covers the floating SMTC.

Certain aspects provide a computer readable medium having computer executable code stored thereon for wireless communication. The computer executable code generally includes code for receiving, from a serving cell, a floating SMTC for measurement of a target cell, wherein the serving cell and the target cell are asynchronous. The computer executable code generally includes code for determining a measurement gap that covers the floating SMTC and code for monitoring in the determined measurement gap for a SSB transmission of the target cell based on the floating SMTC.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
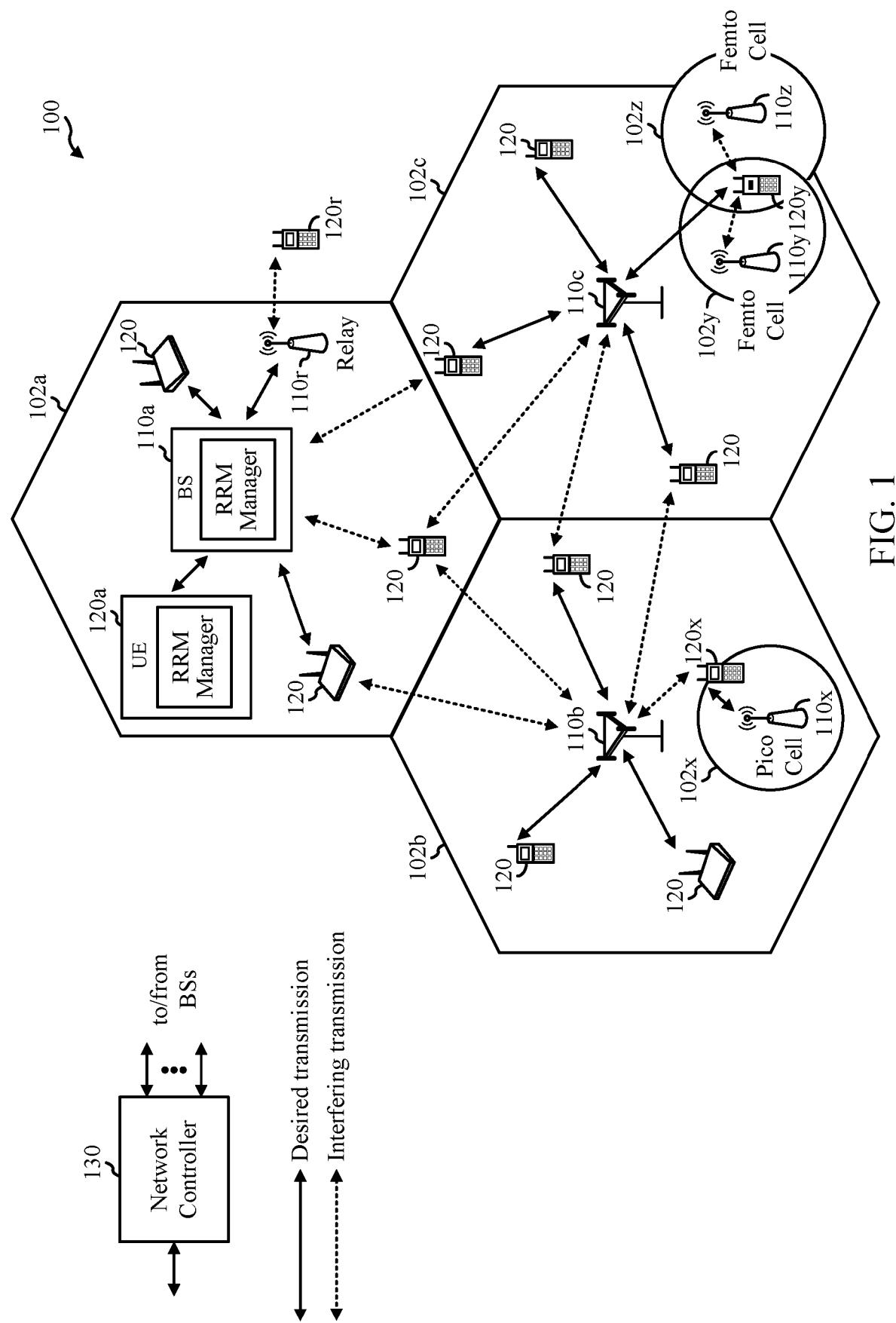
FIG. 1 is a block diagram conceptually illustrating an example telecommunications system, in accordance with certain aspects of the present disclosure.

Certain aspects of the present disclosure provide techniques for a floating synchronization signal block measurement timing configuration (SMTC) for SSB-based radio resource management (RRM) measurements in asynchronous networks, such as new radio (NR).

In certain systems, such as NR, the user equipment (UE) may be configured to measure a target cell SSB for inter-frequency RRM measurements. However, in asynchronous networks, the location of the target SSB is not known due to the timing offset between the serving cell and target cell. Thus, the UE has to blindly detect the target cell SSB. In addition, it is also difficult to configure the measurement gap, not knowing the timing of the target cell.

Accordingly, aspects of the present disclosure provide for a floating SMTC and a floating measurement gap. A UE can be configured with the floating SMTC and measurement gap until an SSB from the target cell is detected. Once the UE detects the timing offset, the UE can report it to the base station (BS), and the BS can configure the normal (e.g., reported) SMTC and measurement gap using the timing offset.

The following description provides examples of a floating SMTS for SS-based RRM in asynchronous networks, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for the various wireless networks and radio technologies. For clarity, while aspects may be described herein using terminology commonly associated with 3G, 4G, or 5G wireless technologies, aspects of the present disclosure can be applied in other generation-based communication systems, including later NR technologies.

NR access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, the wireless communication network 100 may be a 5G NR network.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs 120a-y (each also individually referred to herein as UE 120 or collectively as UEs 120) that may be dispersed throughout the wireless communication network 100. Each UE may be stationary or mobile.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The wireless communication network 100 may have an asynchronous deployment. For asynchronous operation, the BSs 110 may have different frame timing, and transmissions from different BSs 110 may not be aligned in time. As shown in FIG. 1, the BS 110a includes a RRM manager 112. The RRM manager 112 may be configured for the floating SMTC for RRM in the asynchronous wireless network 100, in accordance with aspects of the present disclosure. According to certain aspects, a BS 110a in the cell 102a in wireless communication network 100 determines a floating SMTC for measurement of a target cell (e.g., such as another BS 110b or 110c in the cell 102b or 102c wireless communication network 100) and provides the floating SMTC to at least one UE 120 in the serving cell 102a. The BS 110a determines a measurement gap that covers the floating SMTC. As shown in FIG. 1, the UE 120a includes a RRM manager 122. The RRM manager 122 may be configured for the floating SMTC for RRM in the asynchronous wireless network 100, in accordance with aspects of the present disclosure. The UE 120a monitors in the measurement gap for a SSB transmission of the target cell 102b and/or 102c based on the floating SMTC, to perform RRM measurements of the target cell.

Figure 2:
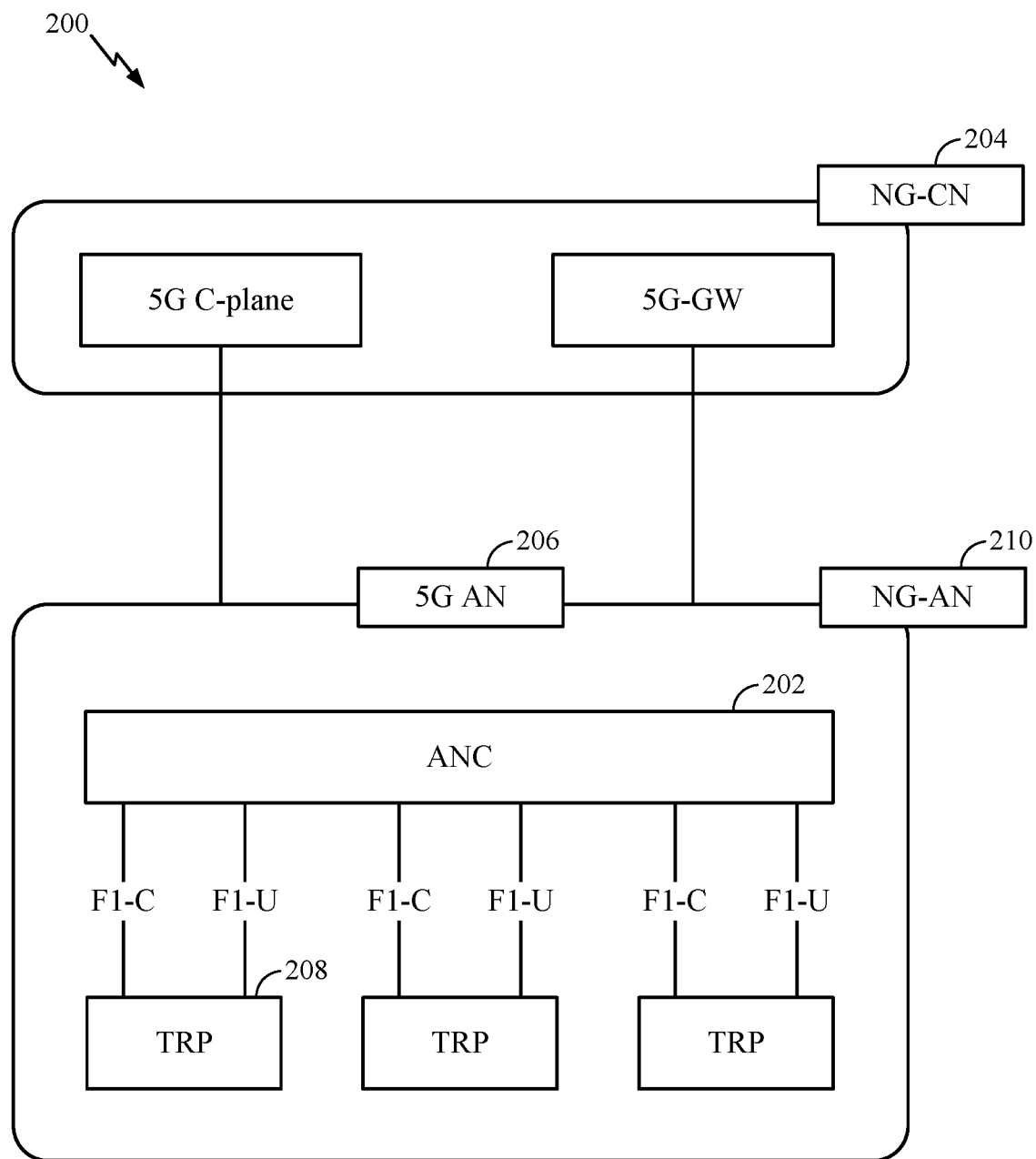
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
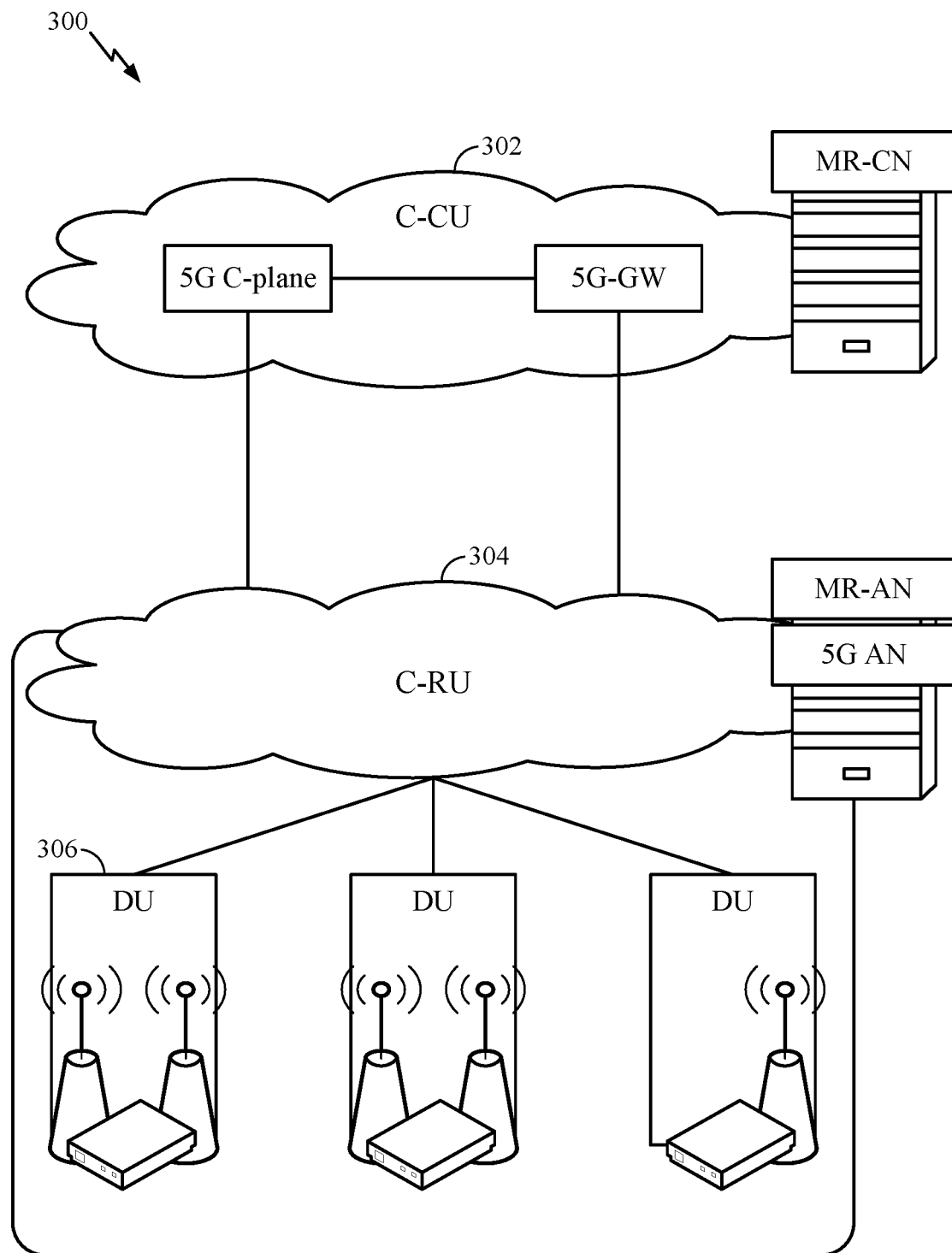
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
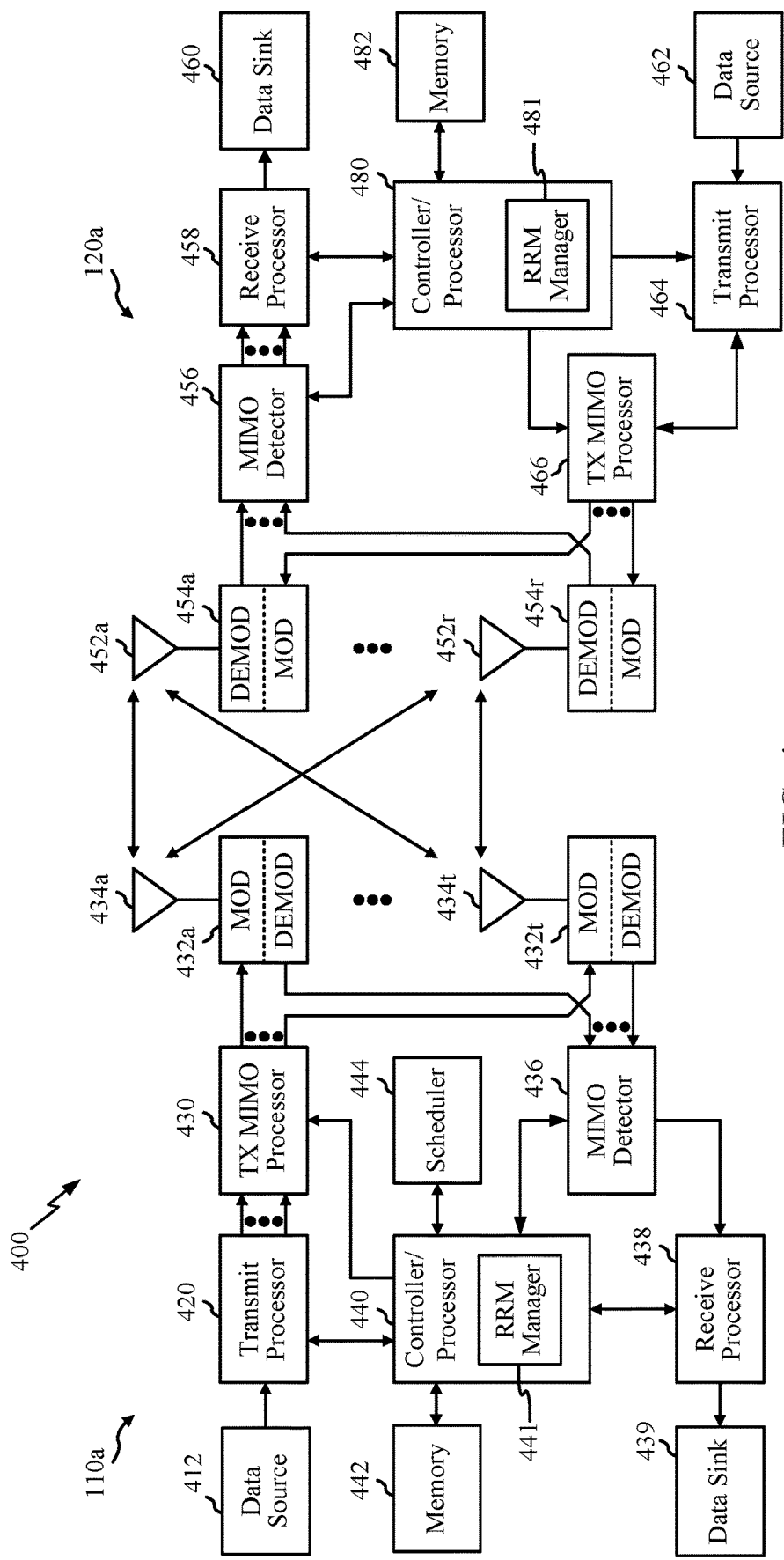
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the BS 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein for a floating SMTC for SSB-based RRM measurements in an asynchronous network. For example, as shown in FIG. 4, the controller/processor 440 of the BS 110a has an RRM manager 441 that may be configured for floating SMTC for RRM in an asynchronous network, according to aspects described herein. As shown in FIG. 2, the controller/processor 480 of the UE 120a has an RRM manager 441 that may be configured for floating SMTC for RRM in an asynchronous network, according to aspects described herein. Although shown at the controller/processor, other components of the UE 120a and BS 110a may be used to perform the operations described herein. The memories 442 and 482 may store data and program codes for BS 110 and UE 120, respectively. A scheduler 444 may schedule UEs for data transmission on the downlink and/or uplink.

Figure 5:
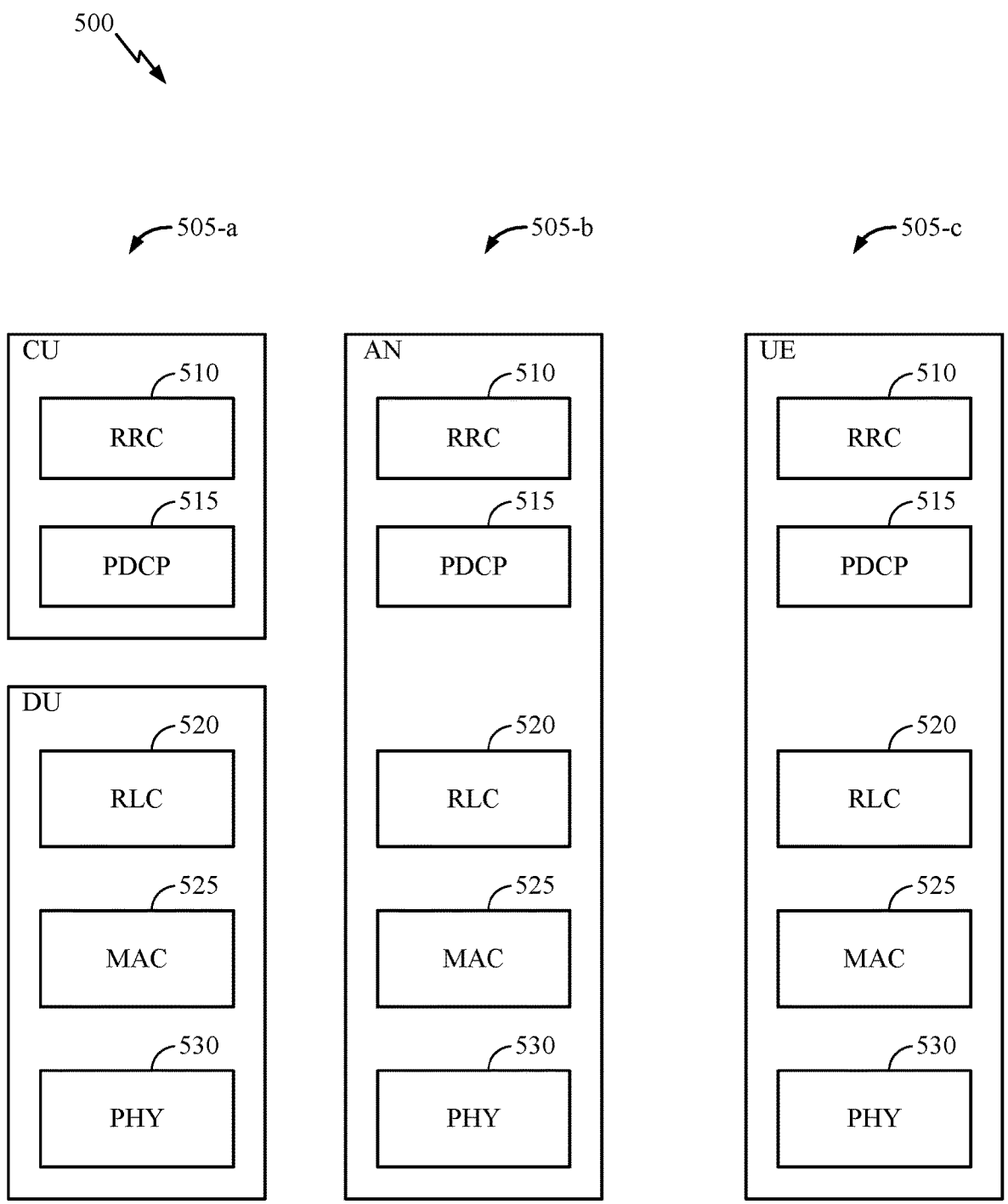
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. NR may utilize OFDM with a cyclic prefix (CP) on the uplink and downlink and include support for half-duplex operation using TDD.

In NR, a subframe is 1 ms, but the basic transmission time interval (TTI) is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum). In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 6:
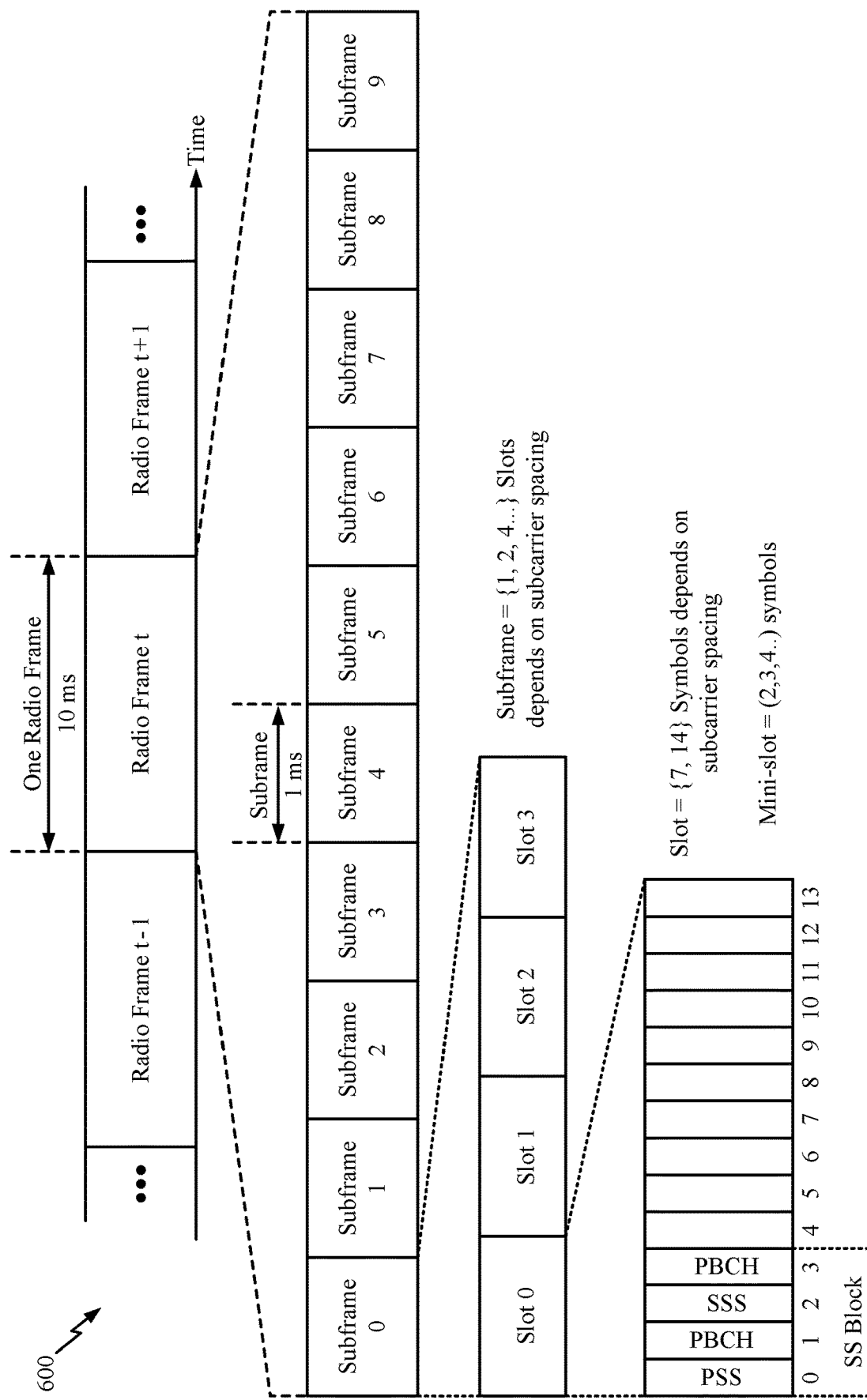
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In certain systems, such as Release 15 of the 3GPP wireless standards for NR (new radio or 5G access technologies), radio resource management (RRM) measurements are performed. RRM measurements may include, for example, channel quality indicator (CQI), reference signal received power (RSRP), reference signal received quality (RSRQ), and/or received signal strength indicator (RSSI) measurements. RRM measurements may be used, for example, for mobility decisions, link adaptation, scheduling, and/or other uses.

Certain systems, such as NR, also use RRM for support of multi-beam operation (e.g., for millimeter wave (mmW) deployments). RRM measurements may include measuring different beams. The RRM measurements may capture changes of the cell. In NR, the single cell quality can be derived from multiple beams (from the cell) which may have different qualities. In some examples, the quality is derived based on a linear average of certain beams (e.g., beams above a quality threshold). In some examples, the single cell quality measurements may be used for handover decisions (e.g., by the network). In NR, RRM measurements can be reported at the beam level (e.g., L3 reporting), as well as the cell level.

In some examples, the common reference signal (CRS) is used for RRM measurements. In NR, the synchronization signal (NR-SS), such as the SS block (SSB), and/or the channel state information reference signal (CSI-RS) can be used for performing RRM measurements. CSI-RS based RRM may provide improved beam resolution. In some examples, only one type of RS is configured for one periodic and/or event-triggered measurement report.

For asynchronous network deployments, the SSB may be used for RRM measurements (e.g., referred to as SSB-based RRM measurement). SSB may be an "always on" reference signal. One example of the SSB is shown in FIG. 6, as discussed above. As shown in FIG. 6, the SSB includes 1-symbol PSS, 1-symbol SSS, and 2 symbols PBCH that are time division multiplexed (TDM'd) in consecutive symbols. As discussed above, the SSBs may be organized into SS bursts to support beam sweeping. In some examples, the transmission of SSBs within an SS burst are confined to a window. The SSB can be transmitted up to L times (e.g., L=64 times), in L different slots, with up to L different beam directions for mmW, for example, according to a beam-sweeping pattern. The transmissions may be referred to as SYNC burst set. Multiple SYNC burst sets may be transmitted at a periodicity.

A cell may be associated with a SSB measurement timing configuration (SMTC) based on its configuration for SSB transmission. The SMTC may define an SMTC window duration (e.g., {1, 2, 3, 4, 5} ms); an SMTC window timing offset (e.g., {0, 1, SMTC periodicity-1} ms); and an SMTC periodicity (e.g., {5, 10, 20, 40, 80, 160} ms). The SMTC may be configured by the network for SSB-based RRM measurements. For example, the SMTC may be configured with a measurement object.

Figure 7:
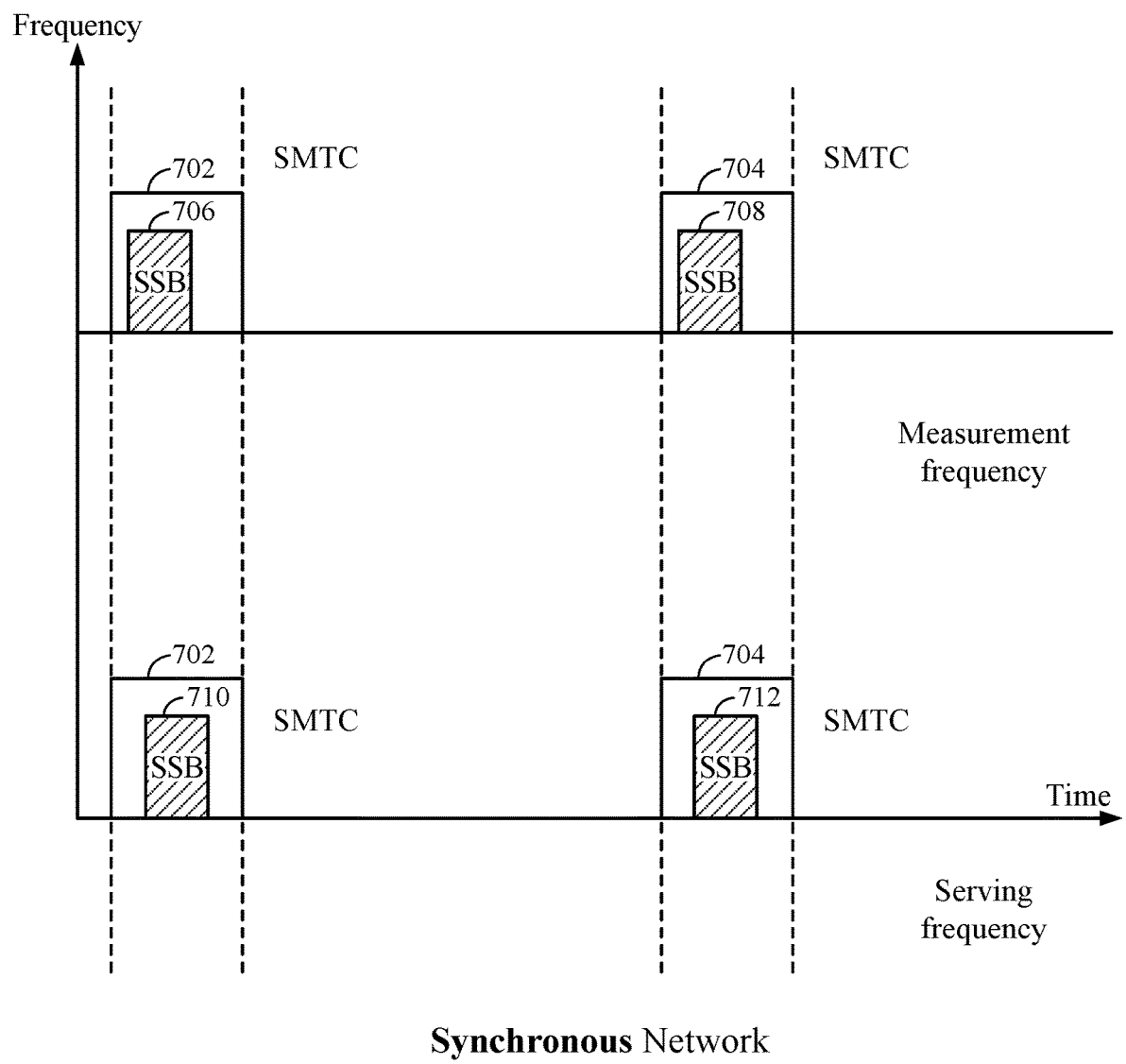
FIG. 7 is an example of synchronization signal block (SSB) transmission in a synchronous network.
Figure 8:
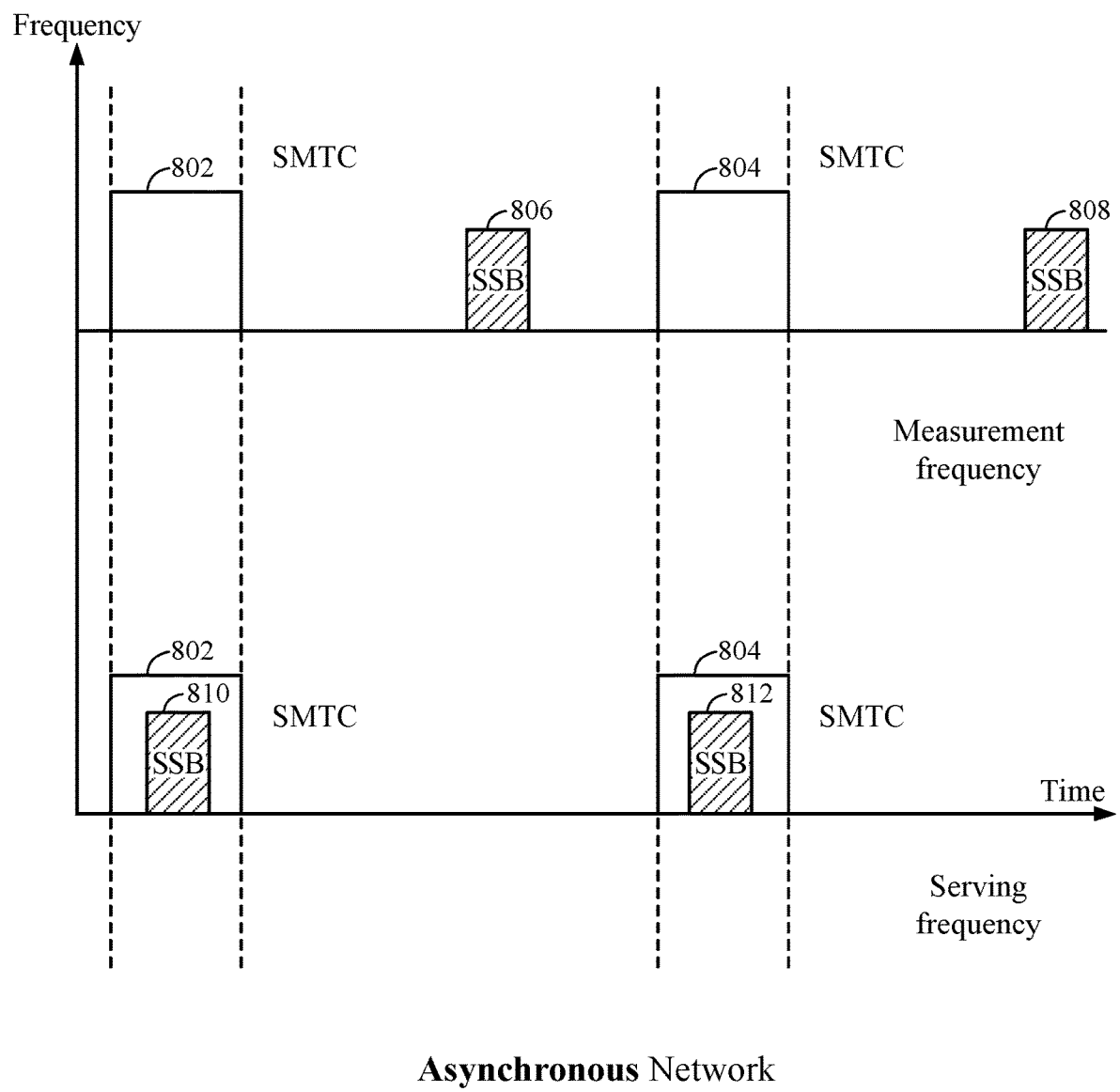
FIG. 8 is an example of SSB transmission in an asynchronous network, in accordance with certain aspects of the present disclosure.

In some systems, such as Release-15 NR, the network is synchronous. In a synchronous network, the timing offset between cells is small. Thus, as shown in FIG. 7, in a synchronous network the target cell SSB 706, 708 falls within the same SMTC window 702 as the serving cell SSBs 710, 712. In some systems; however, such as Release-16 NR, the network may be asynchronous. In this case, the target cell(s) to measure in the target frequency may be asynchronous with the UE's serving cell. Thus, the SSBs of the serving cell and target may not be aligned. As shown in FIG. 8, in an asynchronous network, the SSBs (810, 812) from the serving cell and the SSBs 806, 808 from the target cells having a time offset (that may be large) and the SSBs 806, 808 for the target cell may be outside the SMTC window 802. Thus, the UE blindly detects the target cell(s) SSB.

In networks that use CRS-based RRM measurement, the CRS is transmitted as 5 ms periodicity and the measurement gap is 6 ms. Thus, even if asynchronous, the UE can always measure a CRS in the measurement gap because the CRS periodicity is smaller than the measurement gap duration. However, as discussed above, the periodicity of SSB is larger (e.g., up to 160 ms).

Also, for the asynchronized network deployment, it is difficult to configure the measurement gap when target cell SMTC is not available.

Accordingly, techniques for SSB-based RRM measurement for asynchronous networks are desired.

Example Floating SMTC for SSB-Based RRM in Asynchronous Networks

Figure 9:
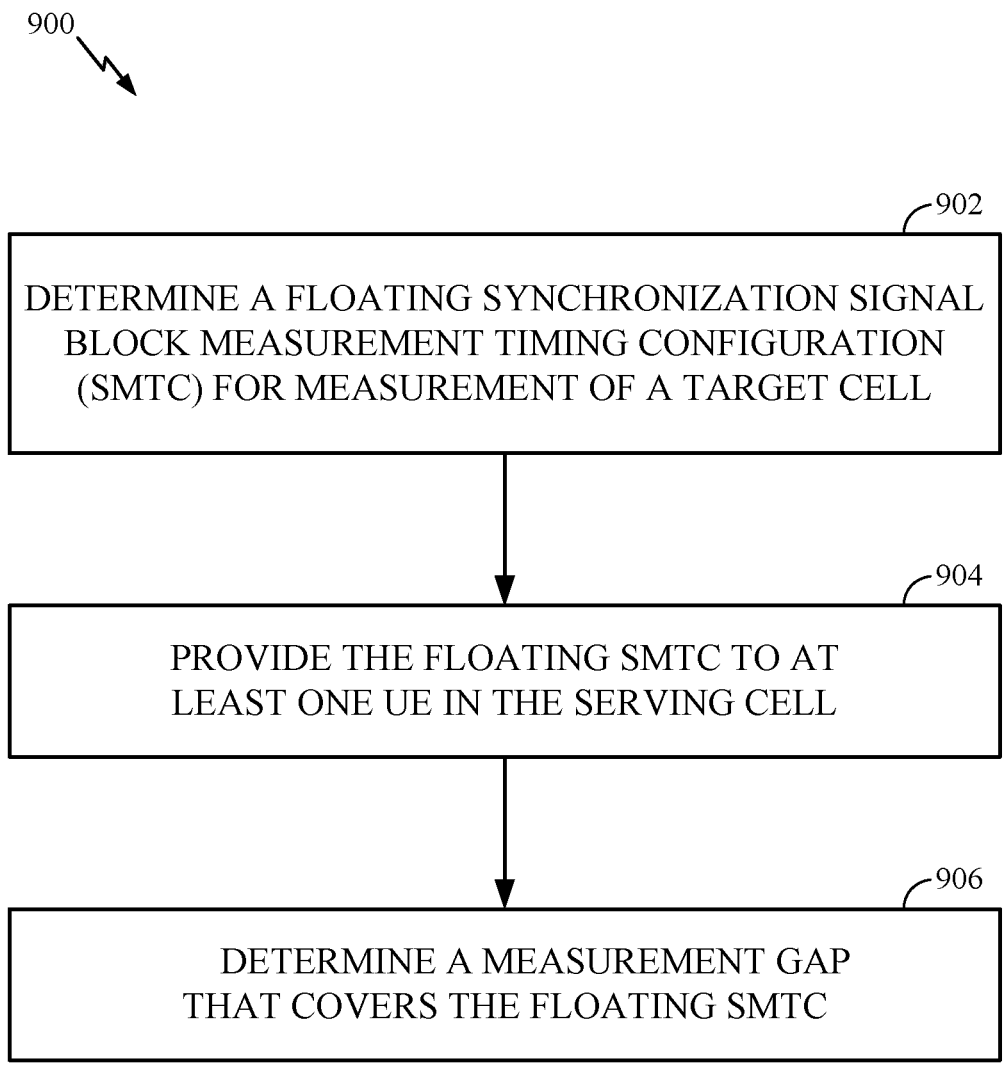
FIG. 9 is a flow diagram illustrating example operations by a BS in a serving cell for wireless communication, in accordance with certain aspects of the present disclosure.

Aspects of the present disclosure provide techniques for a floating synchronization signal block measurement timing configuration (SMTC) for inter-frequency radio resource management (RRM) measurement. The floating SMTC may be used when the SMTC of the target is not available to the user equipment (UE). In some examples, the network randomly selects/requests the UE to perform the RRM inter-frequency measurements with the floating SMTC or the network may select/request the UE that first needs such measurements. The measurement gap offset is also floating with (to cover) the floating SMTC FIG. 9 is a flow diagram illustrating example operations 900 for wireless communications, in accordance with certain aspects of the present disclosure. The operations 900 may be performed, for example, by a BS (e.g., such as a BS 110 in the wireless communication network 100) in a serving cell (e.g., on a serving frequency). Operations 900 may be implemented as software components that are executed and run on one or more processors (e.g., controller/processor 440 of FIG. 4). Further, the transmission and reception of signals by the BS in operations 400 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

The operations 900 may begin, at 902, by determining a floating SMTC for measurement (e.g., inter-frequency RRM measurement) of a target cell (e.g., on a target frequency) or target cells. In some examples, the serving cell and the target cell are asynchronous. The floating SMTC configures a duration, periodicity, and timing offset to monitor for SSB transmission by the target cell(s). In some examples, SSB periodicity is frequency layer specific; however, the timing offset between the serving cell and target cell may depend on the target cell and the UE.

According to certain aspects, the BS receives the target cell SSB periodicity. The BS may receive the target cell SSB periodicity via coordination with the target cell (e.g., an inter-node message which may be via a backhaul) or via an operation, administration, and management (OAM) configuration. The periodicity in the floating SMTC may be the received target cell SSB periodicity.

According to certain aspects, the duration is the maximum duration. In some examples, the duration in the floating SMTC may be 5 ms, 4 ms, 3 ms, 2 ms, or 1 ms.

According to certain aspects, the offset for the floating SMTC is configured as a floating offset. For example, the BS configures an initial offset (e.g., 0) that is incremented after each unsuccessful monitoring at the configured periodicity. The BS may further configure the amount of the increment (step). The size of the step, Δs, may be less than the difference between the configured periodicity and the configured duration (i.e., Δs<periodicity−duration) of the floating SMTC. Thus, the SMTC offset will increase one floating step compared with the previous SMTC periodicity.

At 904, the BS provides the floating SMTC to at least one UE in the serving cell. The BS may configure a measurement object for the UE as one SSB. In some examples, the BS randomly selects (or requests) the UE to configure for performing the inter-frequency RRM measurements with the floating SMTC. In some examples, the BS selects (or requests) the UE that first needs to performs inter-frequency RRM measurements as the UE to configure for performing the inter-frequency RRM measurements with the floating SMTC.

At 906, the BS determines a measurement gap that covers the floating SMTC. The BS may provide/configure the determined measurement gap to the at least one UE. In some examples, the measurement gap has the same offset and periodicity as the configured floating SMTC and a duration that is at least as long as the duration of the configured floating SMTC.

According to certain aspects, the BS receives an indication from the UE of the offset at which the SSB of the target cell(s) is detected. Once the BS is informed of the target cell(s) SSB offset, the BS may configure/reconfigure one or more other UEs (e.g., in addition to the UE), in the serving cell with the indicated offset for measuring the target cell(s). For example, the BS configures a "normal"—non-floating— SMTC with the detected timing offset. The BS also configures/reconfigures the measurement gap—non-floating— based on the detected time offset.

Figure 10:
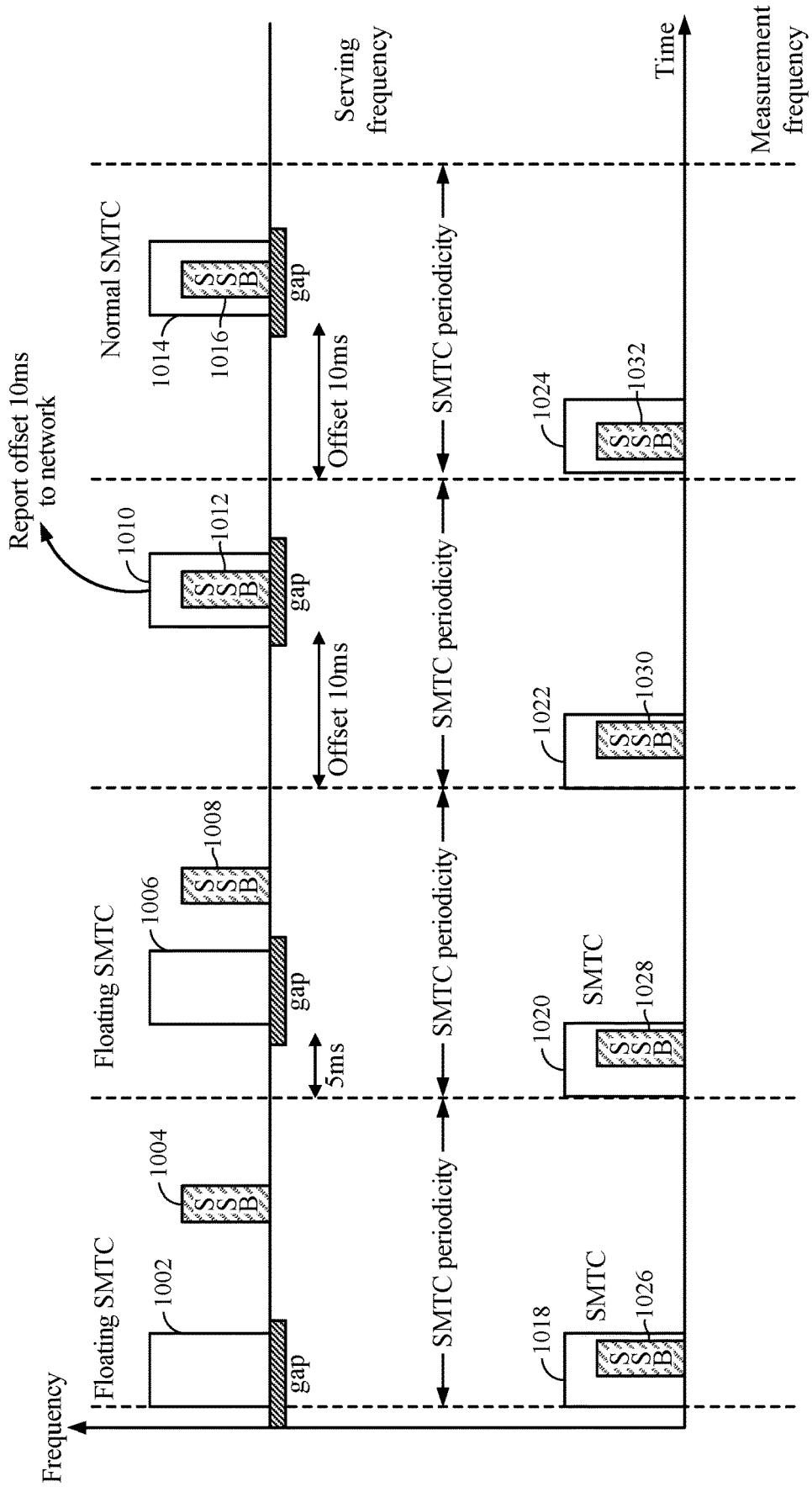
FIG. 10 is a timeline showing an example floating SSB measurement timing configuration (SMTC) and measurement gap configuration, in accordance with certain aspects of the present disclosure.

FIG. 10 is a timeline showing an example floating SMTC and measurement gap configuration, in accordance with certain aspects of the present disclosure. In the example shown in FIG. 10, the serving cell and the target cell are asynchronous. Thus, the offset of the target cell ("measurement frequency) is unknown. In the example shown in FIG. 10, the SMTC periodicity in the target cell is 20 ms and the duration is 5 ms. Thus, the SSBs 1002, 1004, 1006, 1008 in the serving cell are not aligned (asynchronous) with the SSBs 1010, 1012, 1014, 1016 in the target cell. Thus, the serving cell can SMTC 1018 can be used for measurements of the serving cell, the serving cell configures a floating SMTC for the target cell. In the example shown in FIG. 10, the serving cell may configure a floating SMTC with a 20 ms periodicity (i.e., the periodicity of the target cell, which may be known by backhaul or OAM configuration), 5 ms duration (e.g., a maximum duration), and a floating offset with an initial offset of 0 ms and a floating step of 5 ms. Thus, as shown in FIG. 10, the UE can initially monitor for SSB from the target cell at the floating SMTC window 1020 with the 0 ms offset. In the illustrated example, the UE does not detect the SSB, so the UE monitors target cell SSB in the next SMTC window 1022 (after the STMC periodicity) at the 5 ms offset. The UE does not detect the SSB, so in the next SMTC window 1024, the UE monitors at the 10 ms offset. In this example, the UE detects SSB. Thus, the UE reports the 10 ms offset to the serving cell and the serving configures/reconfigures normal (non-floating) SMTC with the 20 ms periodicity, the 5 ms duration, and with the 10 ms offset. As shown in FIG. 10, the UE then continues to monitor target cell SSB with the SMTC 1024 at the 10 ms offset.

Figure 11:
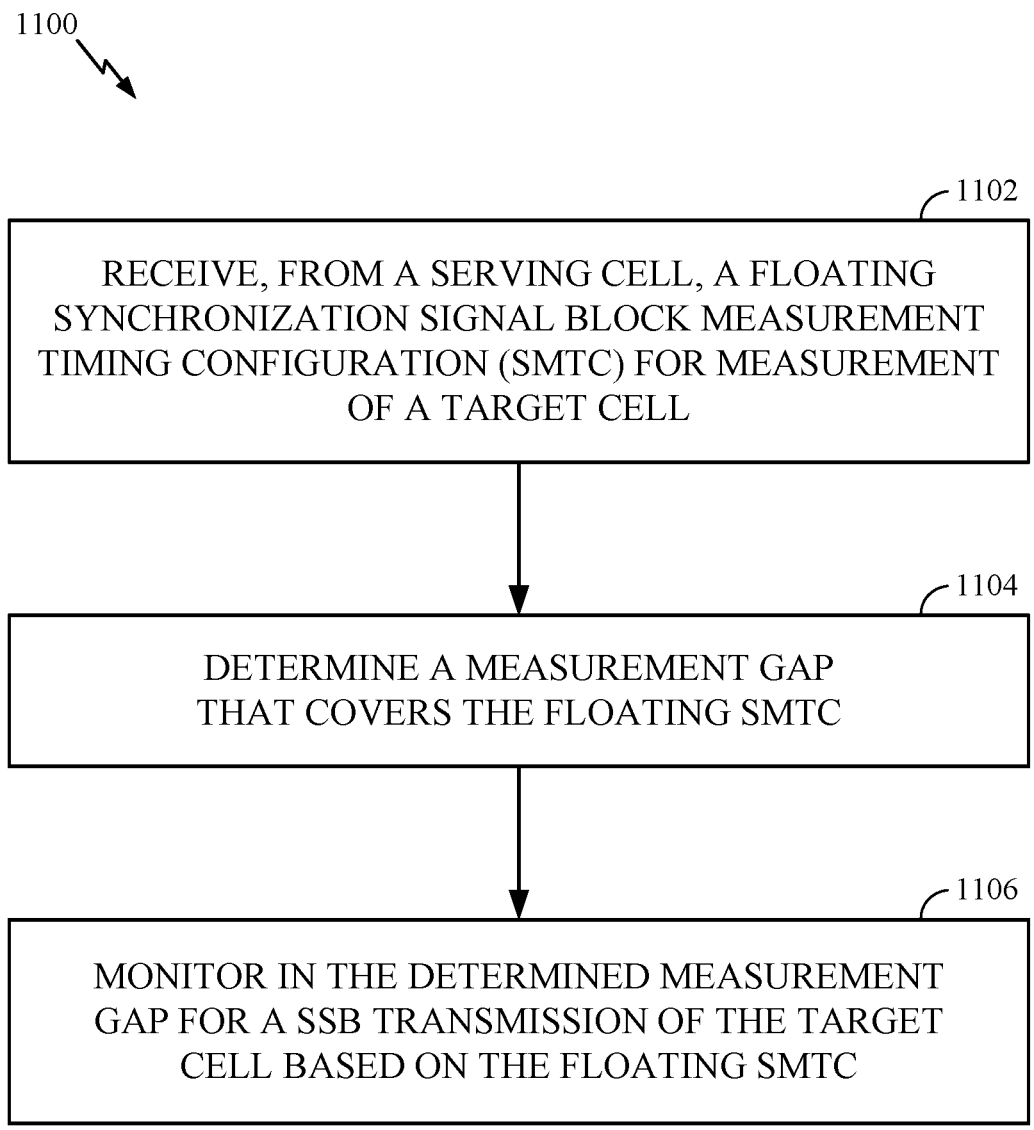
FIG. 11 is a flow diagram illustrating example operations by a UE for wireless communication, in accordance with certain aspects of the present disclosure.

FIG. 11 is a flow diagram illustrating example operations 1100 for wireless communication, in accordance with certain aspects of the present disclosure. The operations 1000 may be performed, for example, by a UE (e.g., such as a UE 120 in the wireless communication network 100) in a serving cell (e.g., on a serving frequency). The operations 1100 may be complementary operation by the UE to the operations 900 performed by the BS. Operations 1100 may be implemented as software components that are executed and run on one or more processors (e.g., controller/processor 480 of FIG. 4). Further, the transmission and reception of signals by the UE in operations 1100 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

The operations 1100 may begin, at 1102, by receiving, from a serving cell, a floating SMTC for measurement (inter-frequency RRM measurement) of a target cell (or cells). The serving cell and target cell(s) may be asynchronous. The UE may receive a measurement object configuration as one SSB. The UE may be randomly selected for the inter-frequency RRM measurements with the floating SMTC or the UE may be the UE, in a group of UEs, that has the first need for RRM measurements.

At 1104, the UE determines a measurement gap that covers the floating SMTC. For example, the UE may receive a floating measurement gap configuration from the target cell.

At 1106, the UE monitors in the determined measurement gap for a SSB transmission of the target cell based on the floating SMTC. According to certain aspects, if the UE does not detect SSB at the initial offset, the UE increments the offset for the next SMTC window after the SMTC periodicity. The UE continues to monitor and increment the offset until an SSB from the target cell is detected. After the UE detects the SSB of the target cell, the UE sends an indication to the serving cell of the offset at which the SSB of the target cell is detected.

Figure 12:
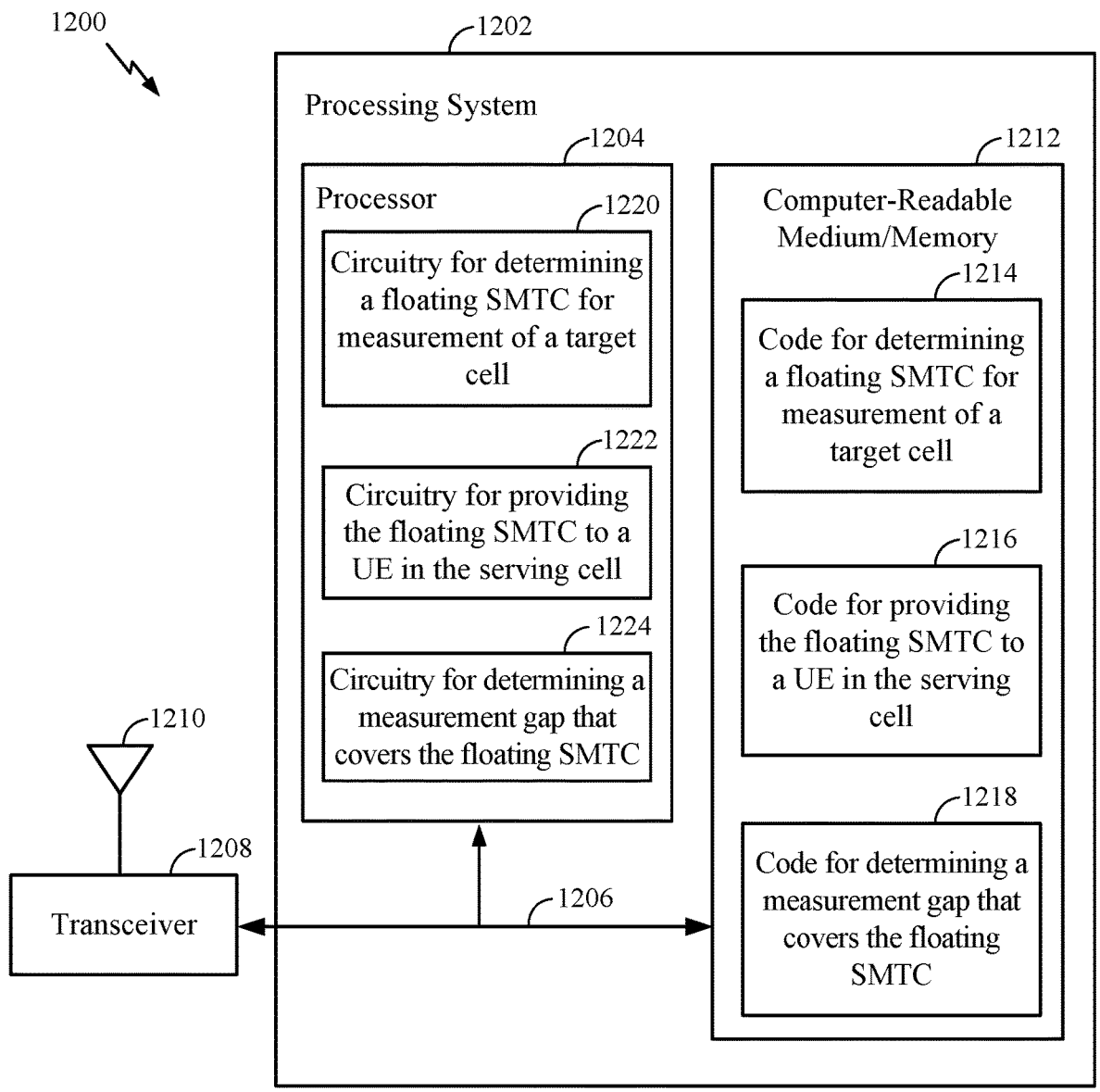
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein for a floating SMTC for SSB-based RRM in an asynchronous network. In certain aspects, computer-readable medium/memory 1212 stores code 1214 for determining a floating SMTC for measurement of a target cell; code 1216 for providing the floating SMTC to a UE in the serving cell; and code 1218 for determining a measurement gap that covers the floating SMTC, in accordance with aspects of the present disclosure. In certain aspects, the processor 1204 has circuitry configured to implement the code stored in the computer-readable medium/memory 1212. The processor 1204 includes circuitry 1220 for determining a floating SMTC for measurement of a target cell; circuitry 1222 for providing the floating SMTC to a UE in the serving cell; and circuitry 1224 for determining a measurement gap that covers the floating SMTC, in accordance with aspects of the present disclosure.

Figure 13:
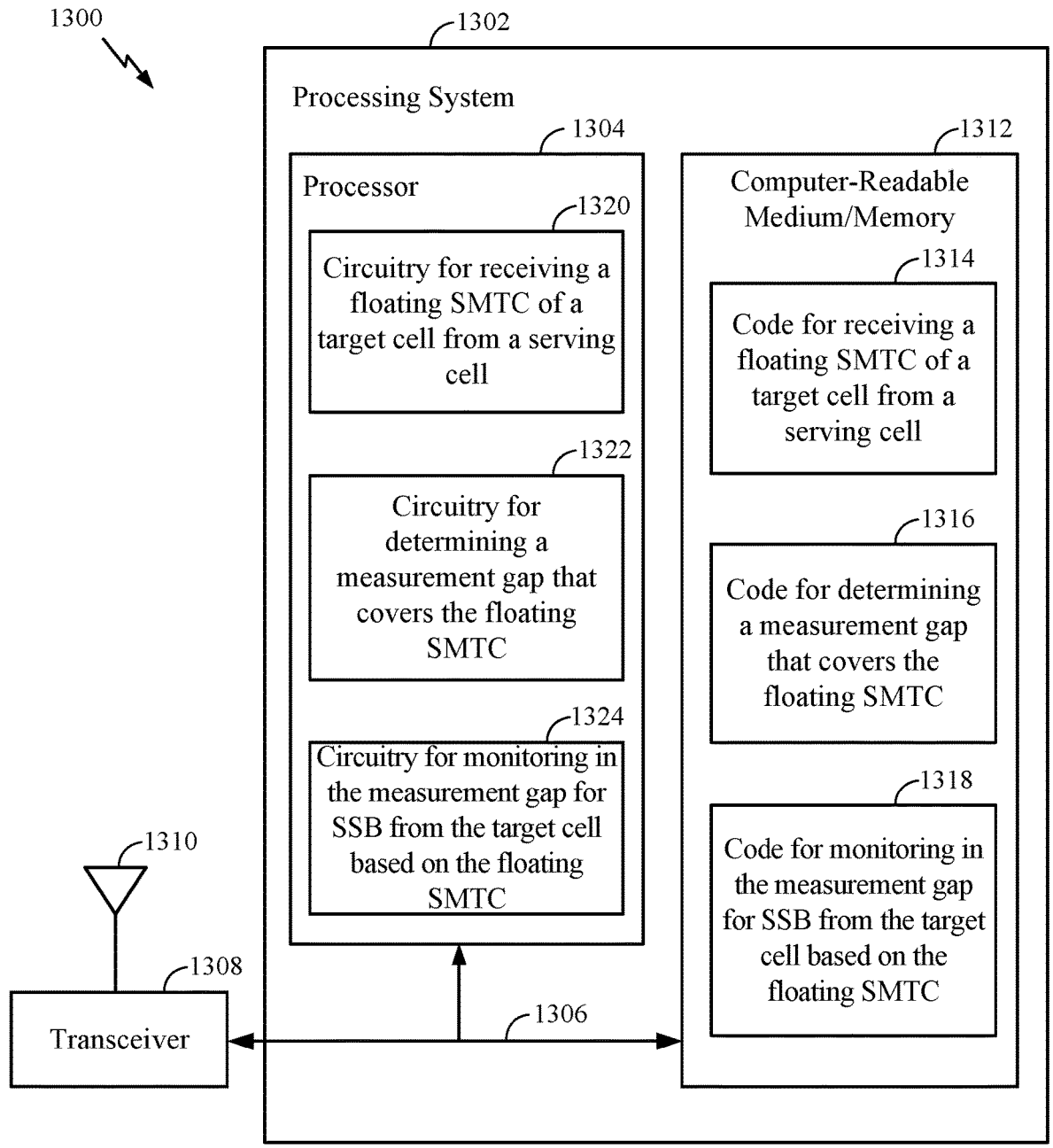
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for a floating SMTC for SSB-based RRM in an asynchronous network. In certain aspects, computer-readable medium/memory 1312 stores code 1314 for receiving a floating SMTC of a target cell from a serving cell; code 1316 for determining a measurement gap that covers the floating SMTC; and code 1318 for monitoring in the measurement gap for SSB from the target cell based on the floating SMTC, in accordance with aspects of the present disclosure. In certain aspects, the processor 1304 has circuitry configured to implement the code stored in the computer-readable medium/memory 1312. The processor 1304 includes circuitry 1320 for receiving a floating SMTC of a target cell from a serving cell; circuitry 1322 for determining a measurement gap that covers the floating SMTC; and circuitry 1324 for monitoring in the measurement gap for SSB from the target cell based on the floating SMTC, in accordance with aspects of the present disclosure.

Example Aspects

In a first aspect, a method for wireless communication by a user equipment (UE) comprises receiving, from a serving cell, a floating synchronization signal block measurement timing configuration (SMTC) for measurement of a target cell, wherein the serving cell and the target cell are asynchronous; determining a measurement gap that covers the floating SMTC; and monitoring in the determined measurement gap for a SSB transmission of the target cell based on the floating SMTC.

In a second aspect, alone or in combination with the first aspect, the SMTC is for inter-frequency radio resource management (RRM) measurements of the target cell; and the method further comprises receiving a measurement object configuration as one SSB.

In a third aspect, alone or in combination with one or more of the first and second aspects, the floating SMTC comprises a duration, periodicity, and timing offset to monitor for SSB transmission by the target cell.

In a fourth aspect, alone or in combination with one or more of the first through third aspects, the offset is configured as a floating offset comprising an initial offset that increments after each unsuccessful SSB monitoring at the floating SMTC periodicity.

In a fifth aspect, alone or in combination with one or more of the first through fourth aspects, the floating SMTC further comprises an amount of the increment.

In a sixth aspect, alone or in combination with one or more of the first through fifth aspects, the monitoring comprises: monitoring for the SSB of the target cell at the initial offset; if the SSB is not detected, incrementing the offset; and after SMTC periodicity monitoring for the SSB of the target cell at the incremented offset.

In a seventh aspect, alone or in combination with one or more of the first through sixth aspects, determining the floating measurement gap comprises receiving a floating measurement gap configuration; and the floating measurement gap has the same offset and periodicity as the floating SMTC and a duration at least as long as the duration of the floating SMTC.

In an eighth aspect, alone or in combination with one or more of the first through seventh aspects, the method further comprises detecting an SSB of the target cell during the monitoring; and sending an indication to the serving cell of the offset at which the SSB of the target cell is detected.

In a ninth aspect, alone or in combination with one or more of the first through eighth aspects, the method further comprises detecting an SSB of the target cell during the monitoring; and performing radio resource management (RRM) of the target cell based on the SSB of the target cell.

In a tenth aspect, alone or in combination with one or more of the first through ninth aspects, the UE is randomly selected for performing measurements of the target cell.

In an eleventh aspect, alone or in combination with one or more of the first through tenth aspects, the UE is a first UE of a group of UEs first requiring measurements of the target cell.

In a twelfth aspect, a method for wireless communication by a base station (BS) of a serving cell comprises determining a floating synchronization signal block measurement timing configuration (SMTC) for measurement of a target cell, wherein the serving cell and the target cell are asynchronous; providing the floating SMTC to at least one user equipment (UE) in the serving cell; and determining a measurement gap that covers the floating SMTC.

In a thirteenth aspect, alone or in combination with the twelfth aspect, the SMTC is for inter-frequency radio resource management (RRM) measurements of the target cell; and the method further comprises configuring a measurement object for the at least one UE as one SSB.

In a fourteenth aspect, alone or in combination with one or more of the twelfth or thirteenth aspects, the method further comprises randomly selecting the at least one UE for performing RRM measurements of the target cell with the floating SMTC.

In a fifteenth aspect, alone or in combination with one or more of the twelfth through fourteenth aspects, the method further comprises selecting the at least one UE for performing RRM measurements of the target cell with the floating SMTC based on which UE first requires to perform measurement for the target cell.

In a sixteenth aspect, alone or in combination with one or more of the twelfth through fifteenth aspects, the method further comprises configuring the at least one UE with the determined measurement gap.

In a seventeenth aspect, alone or in combination with one or more of the twelfth through sixteenth aspects, the floating SMTC comprises a duration, periodicity, and timing offset to monitor for SSB transmission by the target cell.

In an eighteenth aspect, alone or in combination with one or more of the twelfth through seventeenth aspects, the method further comprises receiving a periodicity of SSB transmission of the target cell via at least one of: a backhaul, wherein the floating SMTC periodicity is the received periodicity.

In a nineteenth aspect, alone or in combination with one or more of the twelfth through eighteenth aspects, the method further comprises receiving a periodicity of SSB transmission of the target cell via an operation, administration, and management (OAM) configuration, wherein the floating SMTC periodicity is the received periodicity.

In a twentieth aspect, alone or in combination with one or more of the twelfth through nineteenth aspects, the offset of the floating SMTC is configured as a floating offset comprising an initial offset that increments after each unsuccessful SSB monitoring at the floating SMTC periodicity.

In a twenty-first aspect, alone or in combination with one or more of the twelfth through twentieth aspects, the floating SMTC further comprises an amount of the increment.

In a twenty-second aspect, alone or in combination with one or more of the twelfth through twenty-first aspects, determining the measurement gap that covers the floating SMTC comprises determining the measurement gap has the same offset and periodicity as the floating SMTC and a duration at least as long as the duration of the floating SMTC.

In a twenty-third aspect, alone or in combination with one or more of the twelfth through twenty-second aspects, the method further comprises receiving an indication from the at least one UE of the offset at which the SSB of the target cell is detected.

In a twenty-fourth aspect, alone or in combination with one or more of the twelfth through twenty-third aspects, the method further comprises configuring one or more other UEs in the serving cell with the indicated offset for measuring the target cell.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9 and FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving, from a serving cell, a floating synchronization signal block measurement timing configuration (SMTC) for measurement of a target cell, wherein the serving cell and the target cell are asynchronous,
   the floating SMTC comprises a duration, periodicity, and timing offset to monitor for SSB transmission by the target cell, and
   the offset is configured as a floating offset comprising an initial offset that increments after each unsuccessful SSB monitoring at the floating SMTC periodicity;
   determining a measurement gap that covers the floating SMTC; and
   monitoring in the determined measurement gap for a SSB transmission of the target cell based on the floating SMTC.

2. The method of claim 1, wherein:
   the SMTC is for inter-frequency radio resource management (RRM) measurements of the target cell; and
   the method further comprises receiving a measurement object configuration as one SSB.

3. The method of claim 1, wherein the floating SMTC further comprises an amount of the increment.

4. The method of claim 1, wherein the monitoring comprises:
   monitoring for the SSB of the target cell at the initial offset;
   if the SSB is not detected, incrementing the offset; and
   after SMTC periodicity monitoring for the SSB of the target cell at the incremented offset.

5. The method of claim 1, wherein:
   determining the measurement gap comprises receiving a floating measurement gap configuration; and
   the floating measurement gap has the same offset and periodicity as the floating SMTC and a duration at least as long as the duration of the floating SMTC.

6. The method of claim 1, further comprising:
   detecting an SSB of the target cell during the monitoring; and
   sending an indication to the serving cell of the offset at which the SSB of the target cell is detected.

7. The method of claim 1, further comprising:
   detecting an SSB of the target cell during the monitoring; and
   performing radio resource management (RRM) of the target cell based on the SSB of the target cell.

8. The method of claim 1, wherein the UE is randomly selected for performing measurements of the target cell.

9. The method claim 1, wherein the UE is a first UE of a group of UEs first requiring measurements of the target cell.

10. A method for wireless communication by a base station (BS) of a serving cell, comprising:
    determining a floating synchronization signal block measurement timing configuration (SMTC) for measurement of a target cell, wherein the serving cell and the target cell are asynchronous,
    the floating SMTC comprises a duration, periodicity, and timing offset to monitor for SSB transmission by the target cell, and
    the offset is configured as a floating offset comprising an initial offset that increments after each unsuccessful SSB monitoring at the floating SMTC periodicity;
    providing the floating SMTC to at least one user equipment (UE) in the serving cell; and
    determining a measurement gap that covers the floating SMTC.

11. The method of claim 10, wherein:
    the SMTC is for inter-frequency radio resource management (RRM) measurements of the target cell; and
    the method further comprises configuring a measurement object for the at least one UE as one SSB.

12. The method of claim 11, further comprising randomly selecting the at least one UE for performing RRM measurements of the target cell with the floating SMTC.

13. The method of claim 11, further comprising selecting the at least one UE for performing RRM measurements of the target cell with the floating SMTC based on which UE first requires to perform measurement for the target cell.

14. The method of claim 10, further comprising configuring the at least one UE with the determined measurement gap.

15. The method of claim 10, further comprising receiving a periodicity of SSB transmission of the target cell via at least one of: a backhaul, wherein the floating SMTC periodicity is the received periodicity.

16. The method of claim 10, further comprising receiving a periodicity of SSB transmission of the target cell via an operation, administration, and management (OAM) configuration, wherein the floating SMTC periodicity is the received periodicity.

17. The method of claim 10, wherein the floating SMTC further comprises an amount of the increment.

18. The method of claim 10, wherein determining the measurement gap that covers the floating SMTC comprises determining the measurement gap has the same offset and periodicity as the floating SMTC and a duration at least as long as the duration of the floating SMTC.

19. The method of claim 10, further comprising receiving an indication from the at least one UE of the offset at which the SSB of the target cell is detected.

20. The method of claim 19, further comprising configuring one or more other UEs in the serving cell with the indicated offset for measuring the target cell.

21. An apparatus for wireless communication, comprising:
at least one memory; and
at least one processor coupled to the at least one memory and configured to:
receive, from a serving cell, a floating synchronization signal block measurement timing configuration (SMTC) for measurement of a target cell, wherein the serving cell and the target cell are asynchronous,
the floating SMTC comprises a duration, periodicity, and timing offset to monitor for SSB transmission by the target cell, and
the offset is configured as a floating offset comprising an initial offset that increments after each unsuccessful SSB monitoring at the floating SMTC periodicity;
determine, a measurement gap that covers the floating SMTC; and
monitor, in the determined measurement gap for a SSB transmission of the target cell based on the floating SMTC.

22. The apparatus of claim 21, wherein:
determining the measurement gap comprises receiving a floating measurement gap configuration; and
the floating measurement gap has the same offset and periodicity as the floating SMTC and a duration at least as long as the duration of the floating SMTC.

23. The apparatus of claim 21, the at least one processor is further configured to:
detect an SSB of the target cell during the monitoring; and
send an indication to the serving cell of the offset at which the SSB of the target cell is detected.

24. An apparatus for wireless communication in a serving cell, comprising:
at least one memory; and
at least one processor coupled to the at least one memory and configured to:
determine a floating synchronization signal block measurement timing configuration (SMTC) for measurement of a target cell, wherein the serving cell and the target cell are asynchronous,
the floating SMTC comprises a duration, periodicity, and timing offset to monitor for SSB transmission by the target cell, and
the offset is configured as a floating offset comprising an initial offset that increments after each unsuccessful SSB monitoring at the floating SMTC periodicity;
provide the floating SMTC to at least one user equipment (UE) in the serving cell; and
determine a measurement gap that covers the floating SMTC.

* * * * *